(12) United States Patent
Martínez Maciá et al.

(10) Patent No.: US 12,012,228 B2
(45) Date of Patent: Jun. 18, 2024

(54) DEVICE FOR THE SUPPLY OF FUEL TO AIRCRAFT

(71) Applicant: Vimasol E Hijos, SL, Elche (ES)

(72) Inventors: Juan Martínez Maciá, Elche (ES); Vicente Martínez Maciá, Elche (ES)

(73) Assignee: Vimasol E Hijos, SL, Elche (ES)

( * ) Notice: Subject to any disclaimer, the term of this patent is extended or adjusted under 35 U.S.C. 154(b) by 41 days.

(21) Appl. No.: 18/010,257

(22) PCT Filed: Jun. 16, 2021

(86) PCT No.: PCT/ES2021/070445
§ 371 (c)(1),
(2) Date: Dec. 14, 2022

(87) PCT Pub. No.: WO2022/008770
PCT Pub. Date: Jan. 13, 2022

(65) Prior Publication Data
US 2023/0264834 A1 Aug. 24, 2023

(30) Foreign Application Priority Data

Jul. 9, 2020 (EP) ..................................... 20382616

(51) Int. Cl.
*B64F 1/28* (2006.01)
(52) U.S. Cl.
CPC ..................................... *B64F 1/28* (2013.01)
(58) Field of Classification Search
CPC ....................................................... B64F 1/28
See application file for complete search history.

(56) References Cited

U.S. PATENT DOCUMENTS

| 3,963,044 A | 6/1976 | Brown | |
|---|---|---|---|
| 6,701,980 B2 * | 3/2004 | Rothrock | B67D 7/845 141/231 |
| 8,006,713 B2 * | 8/2011 | Wong | F16L 37/138 285/85 |
| 10,466,719 B2 * | 11/2019 | Kibler | B25J 13/06 |

FOREIGN PATENT DOCUMENTS

| DE | 8905280 U1 | 7/1989 |
|---|---|---|
| EP | 3209914 B1 | 12/2019 |
| JP | S59121299 U | 8/1984 |
| JP | S6052200 U | 4/1985 |
| JP | H0580999 U | 11/1993 |
| JP | H07156895 A | 6/1995 |

* cited by examiner

*Primary Examiner* — Jason K Niesz
(74) *Attorney, Agent, or Firm* — Richard M. Goldberg

(57) ABSTRACT

A device for the supply of fuel to aircraft includes an elevating arm (1) situated above a mobile trolley (1.2) and where the elevating arm (1) is articulated with respect to a shaft (1.1) between a first position that is substantially horizontal and parallel to the surface of the floor and a second elevated position; an adaptor assembly (2) integrally joined to the upper surface of the elevating arm (1) and from which a drive handle (5) emerges frontally which is configured to mobilise the mobile trolley (1.2) by multiple wheels (1.3); and an articulated clamp (3) actuated by an actuation mechanism (4) integrally joined to the adaptor assembly (2) on the lower and internal surface of the elevating arm (1) such that the articulated clamp (3) is configured to be adjusted on a handle of the pit coupler.

6 Claims, 5 Drawing Sheets

DEVICE FOR THE SUPPLY OF FUEL TO AIRCRAFT

BACKGROUND OF THE INVENTION

This invention refers to a mechanical device configured to take and release the hydrant pit coupler for the supply of fuel to aircraft that currently exist in the market. This invention is preferably installed in a coupler lift assistance device, which allows for the releasing or unhooking of the mentioned hydrant pit coupler and the possibility of performing the supply manoeuvre without the elevator coupled to the hydrant pit coupler.

STATE OF THE ART

The Energy Institute and the American Petroleum Institute (EI and API) provide specifications that describe the requirements for products intended for the equipment used in the aviation turbine fuel service or for products used in the aircraft fuel supply procedure. There are currently various pit coupler elevators that enable, with a permanent fixing system, the elevation and later lowering thereof with a permanent connection, without the possibility of releasing the hydrant pit coupler from the elevator.

However, these systems, since they have a permanent and integral connection with the pit coupler, can in some cases interfere with the separable safety mechanism which allows it to be safely separated in the event of an impact on the coupler; it may require some tests by the manufacturers of the pit couplers to verify the absence of interference with the separable security mechanisms. An example of these separable safety couplings is described in document EP3209914B1. Another document that we can find in the state of the art is the Japanese patent JP H05 80999 U2.

SUMMARY OF THE INVENTION

The purpose of this invention is to provide a device for the supply of fuel to aircraft that can elevate the hydrant pit coupler such that it does not interfere in the releasable coupling of the pit coupler (break-away system). This purpose is achieved with the device according to claim 1. In the dependent claims, particular and/or preferred embodiments of the invention are described.

More specifically, the device for the supply of fuel to aircraft comprises an elevating arm situated above a mobile trolley and where the elevating arm is articulated with respect to a shaft between a first position that is substantially horizontal and parallel to the surface of the floor and a second elevated position; an adaptor assembly integrally joined to the upper surface of the elevating arm and from which a drive handle emerges frontally which is configured to mobilise the mobile trolley by means of multiple wheels; and which is characterised by the fact that it comprises an articulated clamp by means of an actuation mechanism integrally joined to the adaptor assembly on the lower and internal surface of the elevating arm such that said articulated clamp is configured to be adjusted on a handle of the pit coupler.

The scope of this invention is defined by the claims. Throughout the description and claims, the word "comprises" and its variants are not intended to exclude other technical characteristics, additives, components or steps. For experts in the field, other purposes, advantages, and features of the invention will be gathered partly from the description and partly from practicing the invention. The following examples of use and associated figures are provided for illustrative purposes and are not exhaustive. In addition, this invention covers all possible combinations of particular and preferred realisations indicated herein.

BRIEF DESCRIPTION OF THE DRAWINGS

Below a series of drawings and sketches are briefly described that help to better understand the invention and are explicitly related to an embodiment of this invention that is presented as a non-limiting example thereof.

DETAIL DESCRIPTION OF THE EMBODIMENTS OF THE INVENTION

Figure 1:
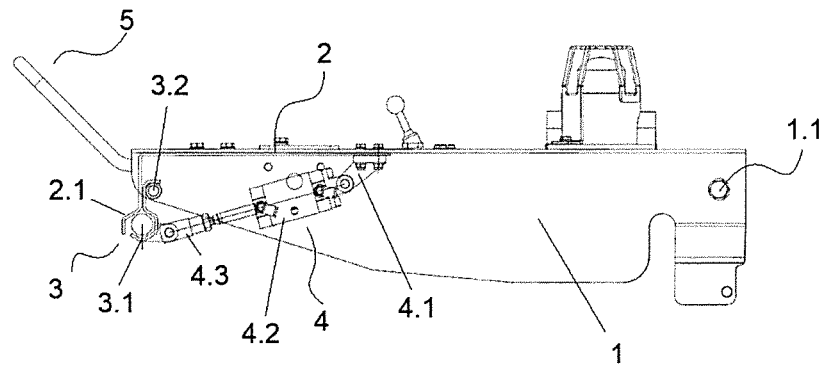
FIG. 1 shows the device of the invention in an embodiment with a single clamp and pneumatic actuation in a closed position

As can be observed in the attached figures, the essential elements of the aircraft fuel device comprise an elevating arm (1) that shall be situated on a mobile trolley (1.2) that can be pulled through a drive handle (5) situated at the front of the elevating arm (1) thanks to the wheels (1.3) and which is joined to the elevating arm (1) through the arm-clamp adaptation assembly (2). The device is completed with an articulated clamp (3) that can be single or double and an actuation mechanism (4) that can be pneumatic or mechanical.

Figure 2:
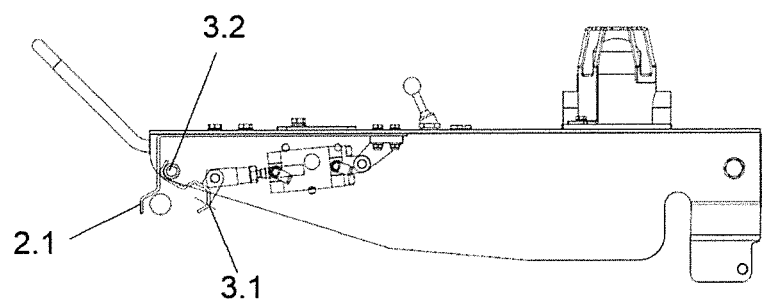
FIG. 2 shows the device of the invention in an embodiment with a single clamp and pneumatic actuation in an open position
Figure 3:
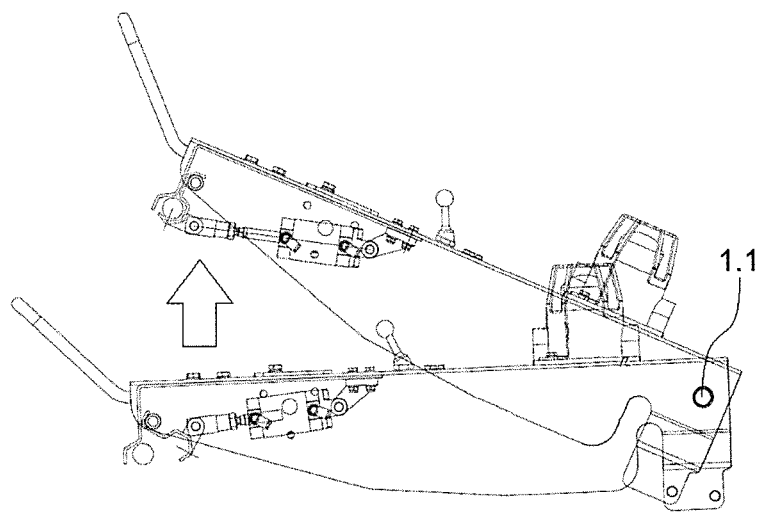
FIG. 3 shows the device of the invention in an embodiment with a single clamp and pneumatic actuation in elevation sequence
Figure 9:
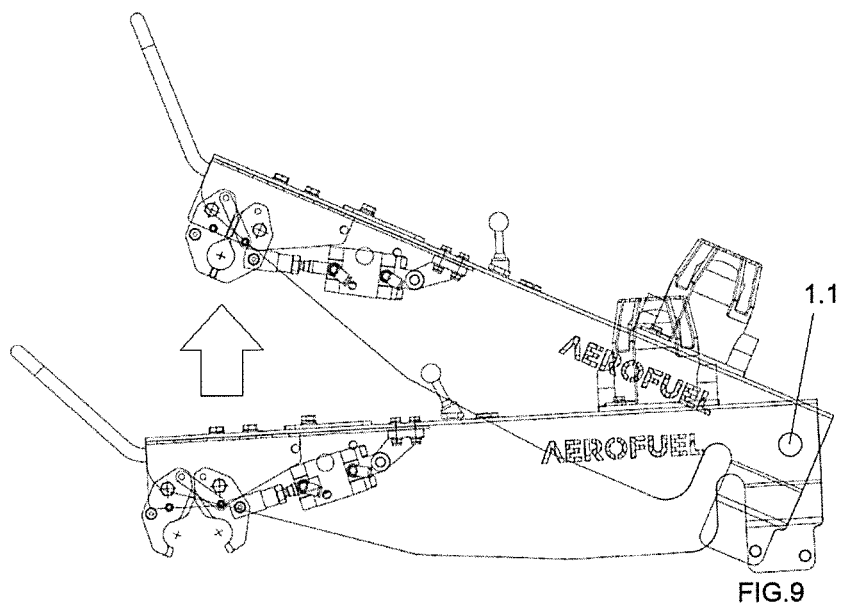
FIG. 9 shows the device of the invention in an embodiment with a double clamp and pneumatic actuation in elevation sequence
Figure 10:
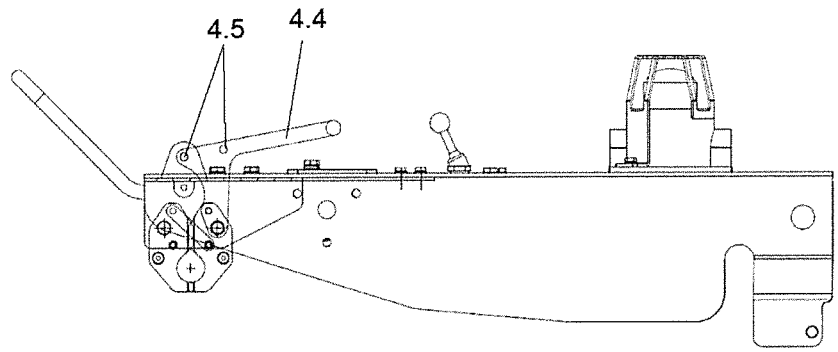
FIG. 10 shows the device of the invention in an embodiment with a double clamp and mechanical actuation in a closed position
Figure 11:
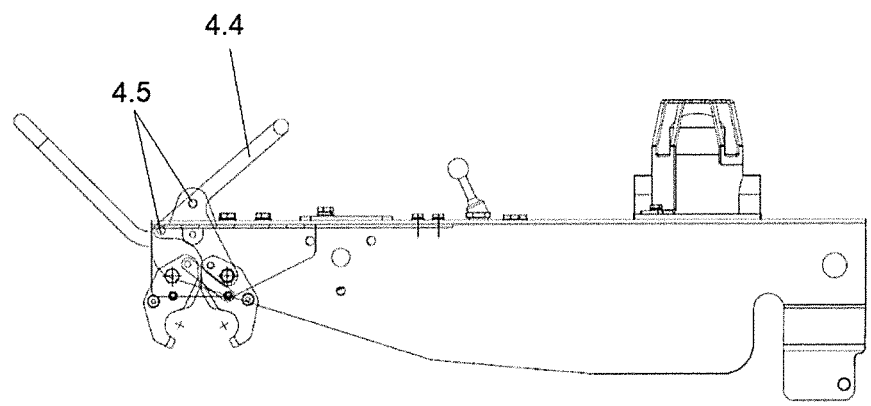
FIG. 11 shows the device of the invention in an embodiment with a double clamp and mechanical actuation in an open position
Figure 12:
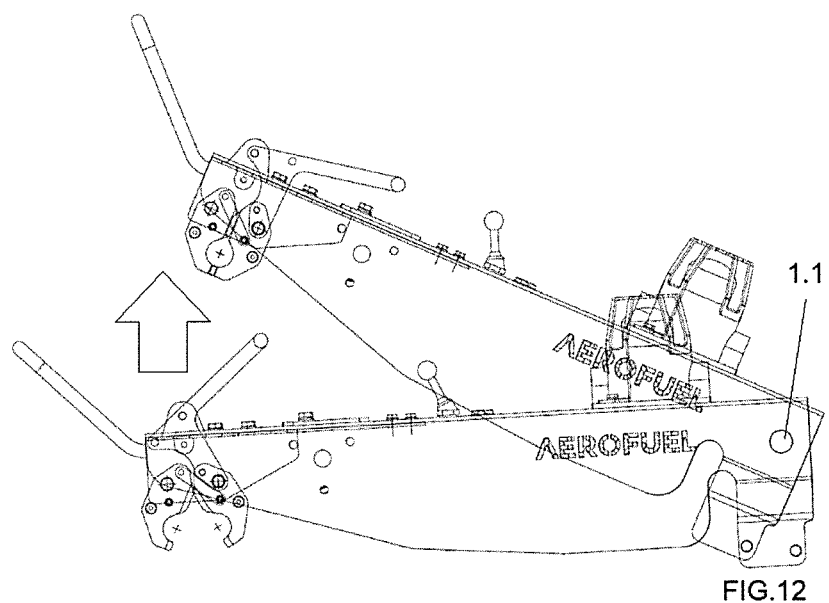
FIG. 12 shows the device of the invention in an embodiment with a double clamp and mechanical actuation in elevation sequence
Figure 13:
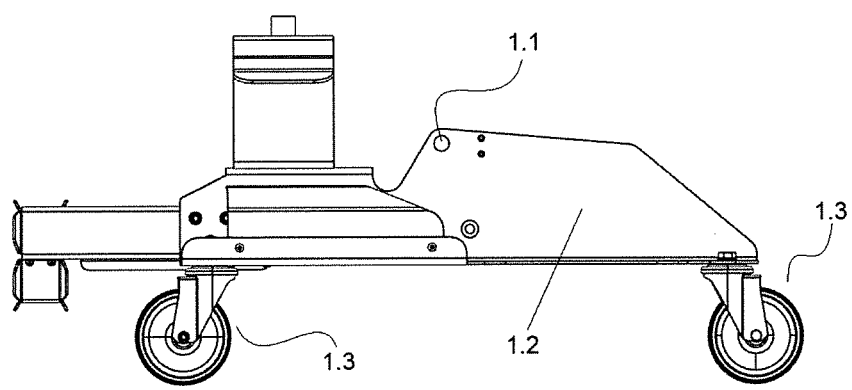
FIG. 13 shows the mobile trolley (1.2) on which the device of the invention is articulated in any of the embodiments shown in FIGS. 1 to 12.

Therefore, this invention comprises four essential embodiments:

a) Single clamp with pneumatic actuation (FIGS. 1 to 3)

b) Single clamp with mechanical actuation (FIGS. 4 to 6)
c) Double clamp with pneumatic actuation (FIGS. 7 to 9)
d) Double clamp with mechanical actuation (FIGS. 10 to 12)

For all the embodiments shown in the attached FIGS. 1 to 13, the elevating arm (1) is articulated with respect to a shaft (1.1) between a first position that is substantially horizontal and parallel to the surface of the floor and a second elevated position. This shaft (1.1) is the joining element with the mobile trolley (1.2) that has multiple wheels at the bottom (1.3) which permit its movement by pulling thanks to the drive handle (5) that the elevating arm (1) has at the front.

The adaptor assembly (2) like the elevating arm (1), functions as a frame for the rest of the elements; the whole assembly can be exchanged if needed at any given time, given each pit coupler of each manufacturer (for example, the Meggit type, the Eaton-Carter type or the Claval type, which refer to the manufacturer of the pit coupler).

First Practical Embodiment. Single Clamp with Pneumatic Actuation (FIGS. 1 to 3)

In this embodiment, the articulated clamp (3) is configured as a stainless-steel folded plate (3.1) soldered to a bolt (3.2) which is configured as an articulation shaft of said folded plate (3.1) when it is actuated by the actuation mechanism (4). The folded plate (3.1), therefore, is articulated between an open position and a closed position against a fixed plate (2.1) of the adaptation assembly (2) which is configured as a stop.

On the other hand, the pneumatic actuation mechanism (4) is configured as a hinge (4.1) fixed on the adaptation assembly (2) on the lower and internal surface of the elevating arm (1) and which is configured to allow the small variations of a pneumatic cylinder (4.2) acting on the folding plate (3.1) which makes up the single articulated clamp (3) through a coupling swivel (4.3).

Figure 4:
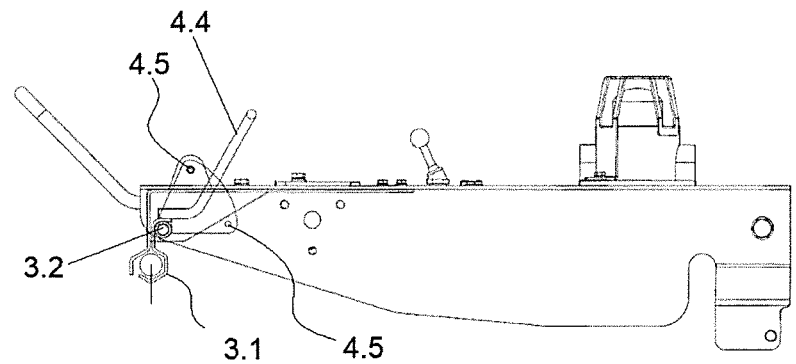
FIG. 4 shows the device of the invention in an embodiment with a single clamp and mechanical actuation in a closed position
Figure 5:
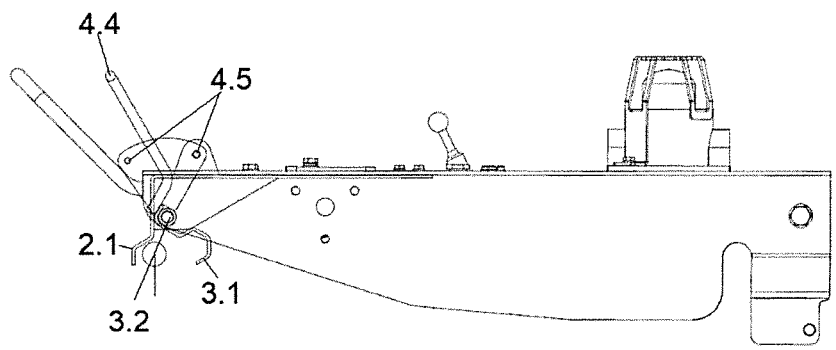
FIG. 5 shows the device of the invention in an embodiment with a single clamp and mechanical actuation in an open position
Figure 6:
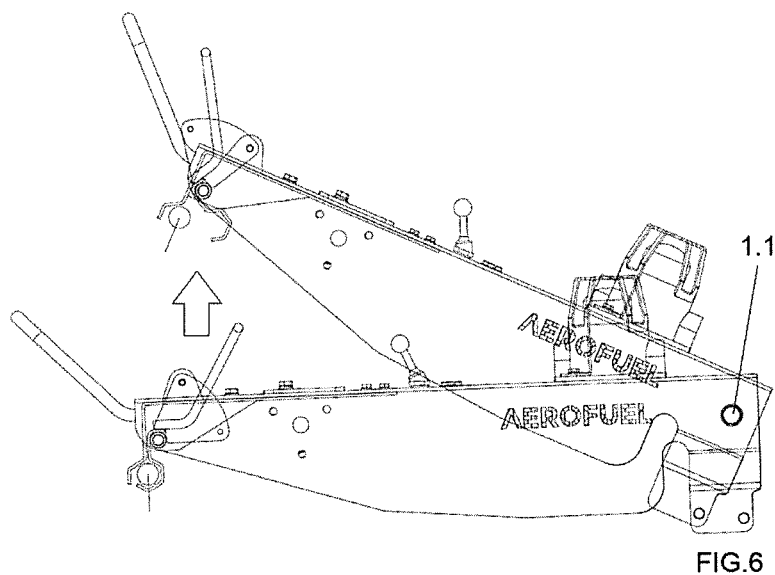
FIG. 6 shows the device of the invention in an embodiment with a single clamp and mechanical actuation in elevation sequence

Second Practical Embodiment. Single Clamp with Mechanical Actuation (FIGS. 4 to 6)

This second embodiment differs from the first embodiment in the actuation mechanism (4), which in this case is of the mechanical type and which is made up essentially of a handle (4.4) soldered or screwed to the plate (3.1) that makes up the single articulated clamp (3). Moreover, it comprises a mechanical locking mechanism (4.5) between a first open position and a second closed position of the handle (4.4).

Figure 7:
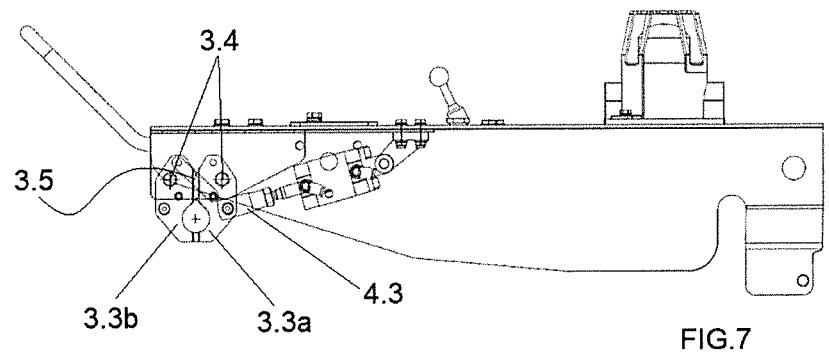
FIG. 7 shows the device of the invention in an embodiment with a double clamp and pneumatic actuation in a closed position
Figure 8:
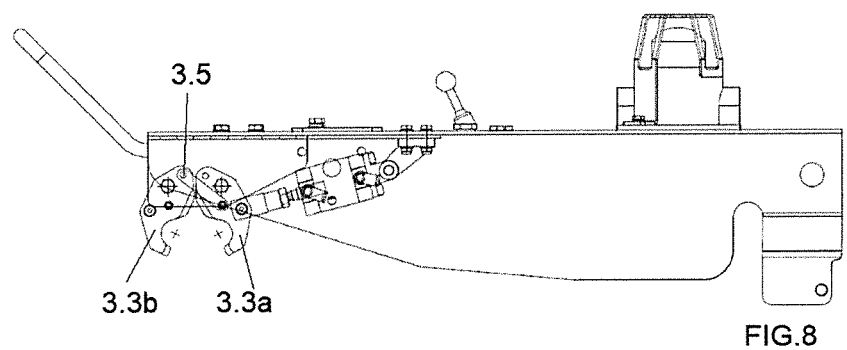
FIG. 8 shows the device of the invention in an embodiment with a double clamp and pneumatic actuation in an open position

Third Practical Embodiment. Double Clamp with Pneumatic Actuation (FIGS. 7 to 9)

In this embodiment, the articulated clamp (3) is configured as two hooks (3.3a) and (3.3b) that are symmetrical and facing one another in a high-density polymer, in aluminium or stainless steel, articulated through two shafts (3.4) and integrated with each other by means of at least one connecting rod (3.5).

On the other hand, the pneumatic actuation mechanism (4) is configured as a hinge (4.1) fixed on the adaptation assembly (2) on the lower and internal surface of the elevating arm (1) and which is configured to allow the small variations of a pneumatic cylinder (4.2) acting on a first hook (3.3a) through a coupling swivel (4.3), such that when the pneumatic cylinder (4.2) actuates said first hook (3.3a), the at least one connecting rod (3.5) actuates the second hook (3.3b) configuring an opening and closing movement with respect to the two shafts (3.4) of the hooks (3.3a) and (3.3b).

Fourth Practical Embodiment. Double Clamp with Mechanical Actuation (FIGS. 10 to 12)

Finally, this fourth practical embodiment differs from the third embodiment in the actuation mechanism (4) which in this case is of the mechanical type and which is made up of essentially an "L"-shaped handle (4.4) integrally joined with the hinge shaft (3.4) of the first hook (3.3a) and which comprises a mechanical locking mechanism (4.5) between a first open position and a second closed position of the handle (4.4).

What is claimed is:

1. A device for the supply of fuel to aircraft, for use with a mobile trolley having multiple wheels and a shaft, the device comprising:
    an elevating arm situated above the mobile trolley and the elevating arm is articulated with respect to the shaft to move between a first position that is substantially horizontal and parallel to the surface of a floor and a second elevated position;
    an adaptor assembly integrally joined to the upper surface of the elevating arm and from which a drive handle emerges frontally which is configured to mobilize the mobile trolley by the multiple wheels;
    an actuation mechanism integrally joined to the adaptor assembly on a lower and internal surface of the elevating arm; and
    an articulated clamp configured to be actuated by the actuation mechanism such that said articulated clamp is adapted to be adjusted on a handle of a pit coupler.

2. The device according to claim 1 wherein the actuation mechanism comprises a handle integrally joined with a hinge shaft of a first hook of the articulated clamp and further comprises a mechanical locking mechanism between a first open position and a second closed position of the handle.

3. The device according to claim 1 where the articulated clamp is configured as a stainless-steel folded plate soldered to a bolt which is configured as an articulation shaft of said folded plate when it is actuated by the actuation mechanism between an open position and a closed position against a fixed plate of the adaptor assembly which is configured as a stop.

4. The device according to claim 3 wherein the actuation mechanism comprises a hinge fixed to the adaptor assembly on the lower and internal surface of the elevating arm, a coupling swivel and a pneumatic cylinder acting on the folded plate through the coupling swivel.

5. The device according to claim 1 wherein the articulated clamp is configured as two hooks, symmetrical and facing one another, which are manufactured in a high-density polymer, in aluminium or in stainless steel, articulated through two shafts and integrated with each other by at least one connecting rod.

6. The device according to claim 5 wherein the actuation mechanism comprises a hinge fixed to the adaptor assembly on the lower and internal surface of the elevating arm, a coupling swivel and a pneumatic cylinder acting on a first hook of the two hooks through the coupling swivel.

* * * * *